United States Patent [19]
Takeuchi et al.

[11] Patent Number: 6,137,150
[45] Date of Patent: *Oct. 24, 2000

[54] SEMICONDUCTOR PHYSICAL-QUANTITY SENSOR HAVING A LOCOS OXIDE FILM, FOR SENSING A PHYSICAL QUANTITY SUCH AS ACCELERATION, YAW RATE, OR THE LIKE

[75] Inventors: Yukihiro Takeuchi, Nishikamo-gun; Toshimasa Yamamoto, Bisai; Tadashi Hattori, Okazaki, all of Japan

[73] Assignee: Nippondenso Co., Ltd., Kariya, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/540,833

[22] Filed: Oct. 11, 1995

[30] Foreign Application Priority Data

Oct. 28, 1994 [JP] Japan .................................... 6-265776

[51] Int. Cl.⁷ .................................................. H01L 29/82
[52] U.S. Cl. .......................... 257/417; 257/415; 257/419
[58] Field of Search ................................... 257/415, 417, 257/418, 419

[56] References Cited

U.S. PATENT DOCUMENTS

| | | |
|---|---|---|
| 4,571,661 | 2/1986 | Hoshino . |
| 5,285,097 | 2/1994 | Hirai . |
| 5,326,726 | 7/1994 | Tsang et al. . |
| 5,461,916 | 10/1995 | Fujii et al. ............................ 73/514.32 |
| 5,500,549 | 3/1996 | Takeuchi et al. ....................... 257/415 |
| 5,504,356 | 4/1996 | Takeuchi et al. ....................... 257/254 |
| 5,619,050 | 4/1997 | Uenoyama et al. ..................... 257/254 |
| 5,627,318 | 5/1997 | Fujii et al. ............................ 73/514.32 |
| 5,684,324 | 11/1997 | Bernstein ................................ 257/415 |
| 5,734,105 | 3/1998 | Mizukoshi ............................ 73/504.02 |
| 5,780,885 | 7/1998 | Diem et al. ............................. 257/254 |
| 5,872,024 | 2/1999 | Fujii et al. ................................ 438/52 |

FOREIGN PATENT DOCUMENTS

| | | |
|---|---|---|
| 4-252961 | 9/1992 | Japan . |
| 5-142251 | 6/1993 | Japan . |
| 5-180862 | 7/1993 | Japan . |
| 6-066569 | 3/1994 | Japan . |
| 6-123628 | 5/1994 | Japan . |
| 6-130081 | 5/1994 | Japan . |
| 92/03740 | 5/1992 | WIPO . |

OTHER PUBLICATIONS

Payne, et al: Surface Micromachined Accelerometer: A Technology Update, pp. 127–135 Feb. 1991.

*Primary Examiner*—David Hardy
*Assistant Examiner*—Allan R. Wilson
*Attorney, Agent, or Firm*—Pillsbury Madison & Sutro LLP

[57] ABSTRACT

The present invention provides a semiconductor physical-quantity sensor which can perform measurement of high accuracy without occurrence of deformation or displacement of a fixed electrode for vibration use even if voltage applied to the fixed electrode for vibration use is changed, and which can increase a dielectric breakdown voltage between the fixed electrode for vibration use and a substrate without varying a thickness of an insulative sacrificial layer or causing sacrificial-layer etching time to be affected. A semiconductor physical-quantity sensor according to the present invention forms an electrode-anchor portion on a sufficiently thick insulation film and causes dielectric breakdown voltage with a semiconductor substrate to be increased. In particular, the sufficiently thick insulation film is given by a LOCOS oxide film formed during sensor detection-circuit fabrication or separation of a diffusion electrode.

16 Claims, 12 Drawing Sheets

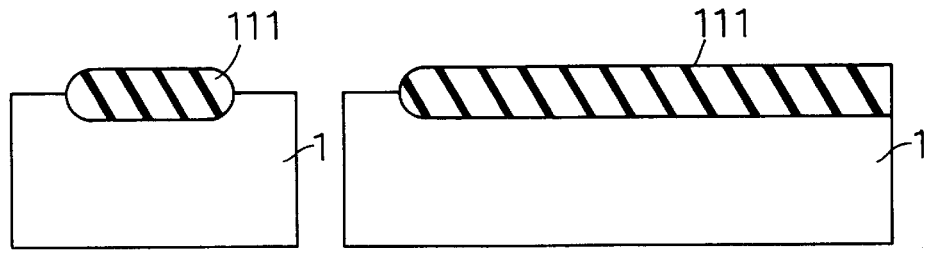
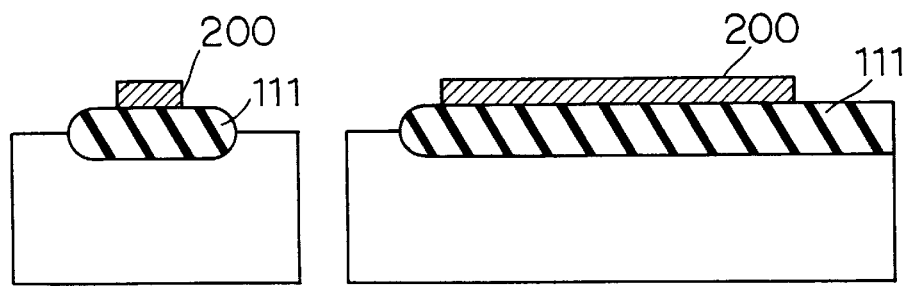
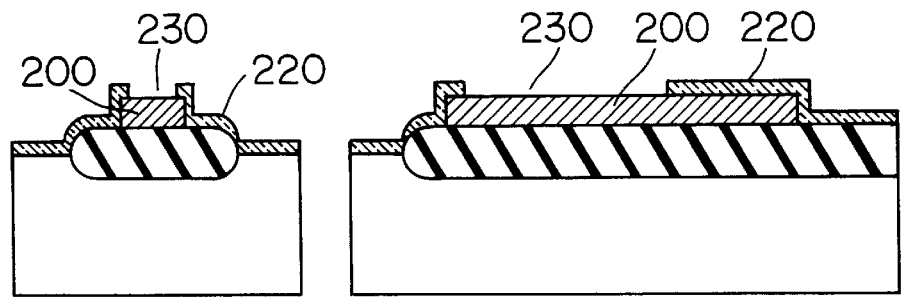
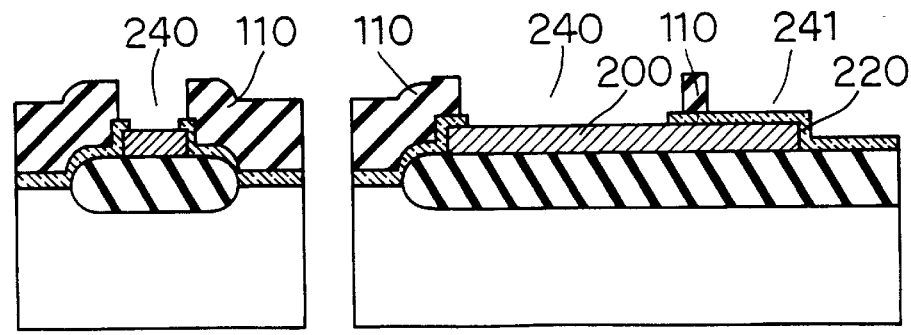

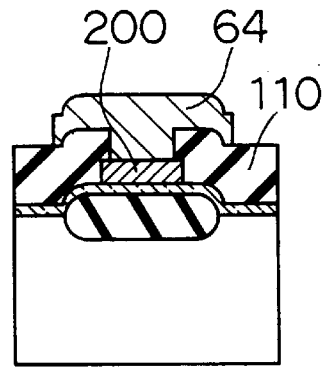
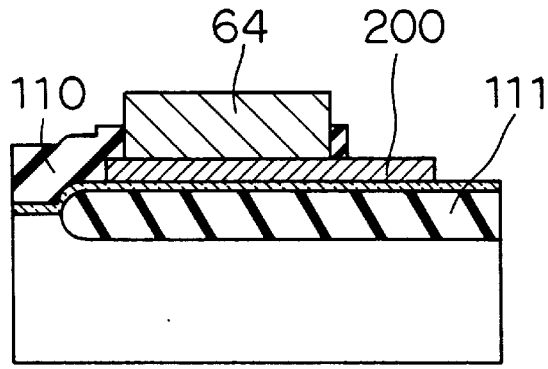
FIG. 24A  FIG. 24B
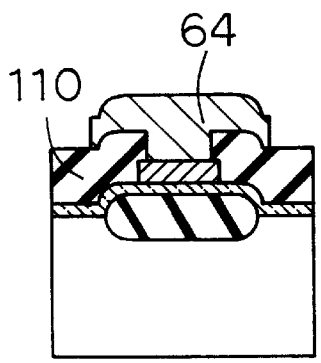
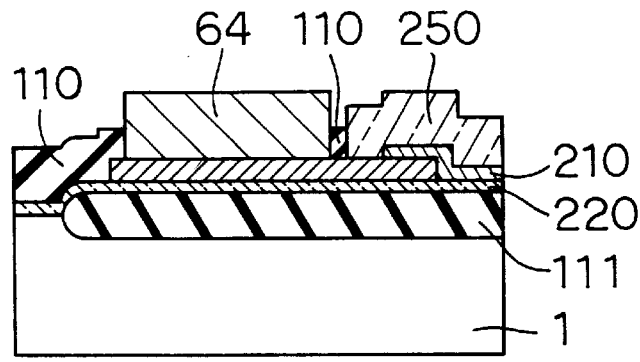
FIG. 25A  FIG. 25B
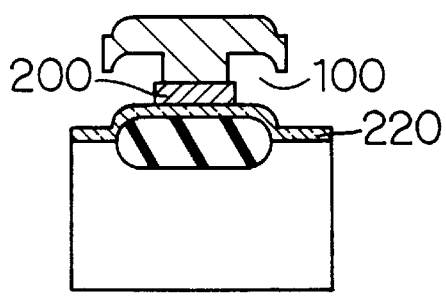
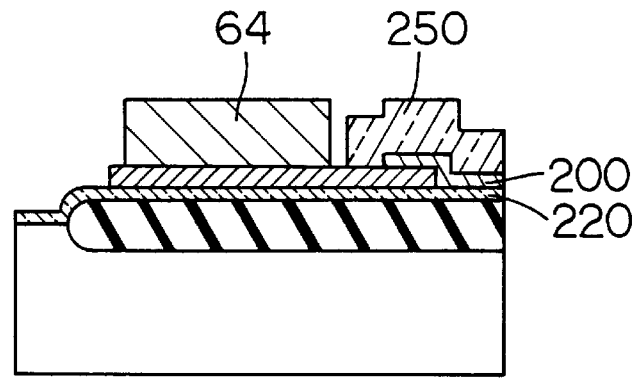
FIG. 26A  FIG. 26B

SEMICONDUCTOR PHYSICAL-QUANTITY SENSOR HAVING A LOCOS OXIDE FILM, FOR SENSING A PHYSICAL QUANTITY SUCH AS ACCELERATION, YAW RATE, OR THE LIKE

CROSS REFERENCE TO RELATED APPLICATION

This application is based upon and claims the benefit of priority of the prior Japanese Patent Application No. 6-265776 filed on Oct. 28, 1994, the contents of which are incorporated herein by reference.

BACKGROUND OF THE INVENTION

1. Field of the Invention

The present invention relates to a semiconductor physical-quantity sensor employing a semiconductor substrate and a method of fabricating same, and more particularly, to a semiconductor physical-quantity sensor having a beam structure and employing electrostatic force to detect acceleration, yaw rate, or the like, and a method of fabricating same.

2. Related Arts

A device indicated in publication SAE910496 exists as an acceleration sensor according to the prior art having a thin-film beam structure. FIG. 27A indicates an entirety of this acceleration sensor.

In FIG. 27A, A0 is a Si substrate, A1 is a beam, A2 is a mass, A3 is a movable electrode which forms electrostatic capacitance and performs servo operation, and A4 is a fixed electrode which forms electrostatic capacitance in an interval with A3 and performs servo operation. From A1 to A4 is formed of polycrystalline silicon, and the mass A2 and movable electrode A3 are so supported by the beam A1 as to be disposed away from the Si substrate A0 with a predetermined interval interposed therebetween. Additionally, the beam A1 and fixed electrode A4 are fixed to the Si substrate A0 at an edge portion A5.

These are formed of polycrystalline silicon using surface micromachining technology on a silicon substrate.

FIG. 27B indicates a sectional view taken along line B—B of FIG. 27A, and FIG. 27C indicates a sectional view taken along line C—C of FIG. 27A.

To describe a principle of detection of this sensor with reference to FIG. 27B, a movable electrode A31 exists normally in a center of fixed electrodes A41 and A42 on both sides, and electrostatic capacitances C1 and C2 between the movable electrode A31 and the fixed electrodes A41 and A42 are equal.

Additionally, voltages V1 and V2 are applied between the movable electrode A31 and the fixed electrodes A41 and A42, V1=V2 when acceleration is not applied, and the movable electrode A31 is pulled by equal electrostatic forces from the fixed electrodes A41 and A42.

Herein, when acceleration acts in a horizontal direction of the substrate and the movable electrode A31 is displaced, the distances between the movable electrode A31 and the fixed electrodes A41 and A42 change, and the electrostatic capacitances C1 and C2 become unequal.

At this time, when, for example, the movable electrode A31 is taken as having been displaced toward the fixed electrode A41, the voltage V1 decreases, the voltage V2 increases, and the movable electrode A31 is thereby pulled toward the fixed electrode A42 by electrostatic force so that the electrostatic capacitances become equal.

When the movable electrode A31 assumes a central position and the electrostatic capacitances C1 and C2 become equal, the applied acceleration and generated electrostatic forces are balanced equally, and magnitude of the acceleration can be detected from the voltages V1 and V2 at this time.

However, in a sensor provided with an electrode of beam structure as shown in FIG. 27A, when static electricity has changed due to acceleration and the voltages V1 and V2 have been caused to change in accompaniment thereto, there exists a problem that, when V1 and V2 become high, an electrical potential differential between the fixed electrodes A41 and A42 and the semiconductor substrate A0 also becomes exceedingly large, and dielectric breakdown occurs between the fixed electrodes A41 and A42 and the semiconductor substrate A0.

For example, because the dielectric breakdown voltage of the oxide film is approximately 10 MV/cm, 10 V becomes an upper limit for voltage which can be applied to the fixed electrodes A41 and A42 on an oxide film of approximately 10 nm. Thus, voltage applied to the fixed electrodes A41 and A42 is restricted.

A method which forms a sufficiently thick insulation film on the semiconductor substrate surface and forms an anchor portion on this thick insulation film may also be considered as a countermeasure for a problem such as this, but the distance between the fixed portions A41 and A42 and the semiconductor substrate A0 surface is greatly offset with respect to the distance between the movable portion A31 and the semiconductor substrate A0 surface, and a problem occurs wherein the position of the movable portion cannot be controlled with good accuracy. Additionally, forming a sufficiently thick insulation film on the entirety of the semiconductor substrate surface may also be considered, but a problem occurs wherein a new step to form a hole in this thick insulation film becomes necessary in order to wire the movable portion and the fixed portions.

Furthermore, in a sensor provided with an electrode of beam structure as shown in FIG. 27A, sectional views are as shown in FIGS. 27B and 27C, but for such a sensor there also exists a problem will be described hereinafter. Namely, there exists a problem that, in a case where voltage applied to the fixed electrodes of both sides has changed during occurrence of acceleration, electrostatic force exerted between the fixed electrodes of both sides and the substrate changes and the fixed electrodes are deformed and displaced with respect to the substrate, the opposing surface area of the movable electrode and the fixed electrodes differs at both sides of the movable electrode, and as a result, the generated electrostatic force differs from the design and acceleration detection of good accuracy cannot be performed.

SUMMARY OF THE INVENTION

In light of the above-described problems, it is an object of the present invention firstly to provide a semiconductor physical-quantity sensor which can improve a dielectric breakdown voltage between a fixed portion (fixed electrode) and semiconductor substrate with no large offset of a movable portion and the fixed portion, and secondly, to provide a semiconductor physical-quantity sensor which can perform high-accuracy physical-quantity detection and for which the fixed portion (fixed electrode) is not prone to deformation, even when voltage applied to the fixed portion (fixed electrode) is caused to be changed, and a method for fabricating same.

To solve the above-described problems, the present invention provides a semiconductor physical-quantity sensor comprising a semiconductor substrate; a movable portion disposed above the semiconductor substrate with a predetermined gap interposed therebetween and supported by a beam-structure body so as to become displaceable; and a fixed portion disposed above the semiconductor substrate at a height containing the same plane as the movable portion, the fixed portion disposed so as to interpose an interval between the fixed portion and the movable portion to displace the movable portion utilizing electrostatic force, thereby detecting a physical quantity from displacement of the movable portion accompanying action of the physical quantity, the sensor being characterized by an insulation film disposed between the semiconductor substrate and the fixed electrode, and the insulation film being a LOCOS (local oxidation of silicon) oxide film.

Consequently, the semiconductor physical-quantity sensor according to the present invention takes a LOCOS oxide film formed during fabrication of a sensor detection circuit or during separation of diffusion electrodes as an insulation film, forms an electrode anchor portion on this insulation film, and increases dielectric breakdown voltage with the substrate along with avoiding an increase in processes and suppressing cost increase.

Additionally, according to the present invention, the insulation film to which the anchor portion for fixed-portion use is fixed is formed of LOCOS oxide film. That is to say, the insulation film is formed not only on the surface of the semiconductor substrate, but also to a predetermined depth from the surface of the semiconductor substrate. A large distance from the LOCOS insulation film surface of the portion to which the anchor portion for fixed-portion use is fixed can thereby be obtained. At that time, moreover, only a portion of the LOCOS oxide film on the semiconductor substrate surface is exposed, and so large offset of the distance between the fixed portion and the semiconductor substrate surface with respect to the distance between the movable portion and the semiconductor substrate surface can be prevented. The position of the movable portion can thereby be controlled with good accuracy. Furthermore, the need for a new step to form a hole in the thick insulation film in order to wire the movable portion and fixed portion can also be prevented.

Moreover, a method for fabricating a semiconductor physical-quantity sensor according to the present invention comprises a step of forming a LOCOS oxide film on a surface of a semiconductor substrate, a step of forming a sacrificial layer on a main surface of the semiconductor substrate, a step of forming a movable portion of beam structure and a fixed portion on the sacrificial layer, and a step of etching away the sacrificial layer so as to cause the movable portion to become displaceable.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIGS. 10A to 17A and FIGS. 10B to 17B are sectional views indicating respective fabrication steps of the structure indicated in FIGS. 8 and 9;

FIGS. 20A to 26A and FIGS. 20B to 26B are sectional views indicating respective fabrication steps of the structure indicated in FIGS. 18 and 19;

DETAILED DESCRIPTION OF THE PRESENTLY PREFERRED EXEMPLARY EMBODIMENTS

A specific embodiment according to the present invention will be described hereinafter with reference to the drawings.

Figure 1:
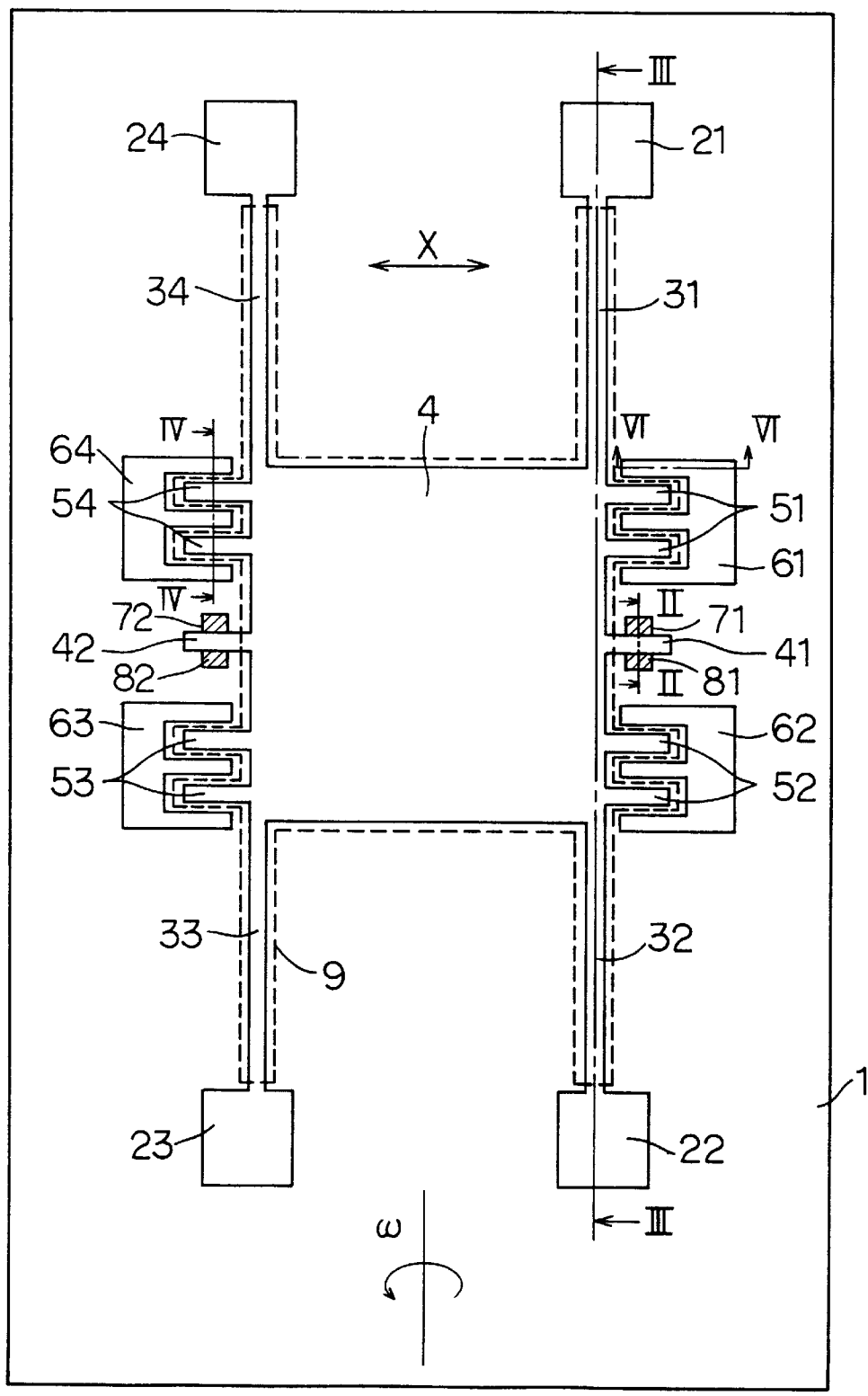
FIG. 1 is a plan view indicating a yaw-rate sensor according to a first embodiment of the present invention.

FIG. 1 is a plan view of a yaw-rate sensor according to the present embodiment, which utilizes a transistor for detection of yaw rate.

In FIG. 1, a semiconductor substrate 1 is a p-type silicon in the present embodiment. A microstructure suspended in a movable state with respect to the semiconductor substrate exists on the semiconductor substrate 1 surface, and has a structure which will be described hereinafter: a weight (mass) 4 to earn an amount of displacement due to yaw rate; beams 31, 32, 33, and 34 to support the weight 4 in a movable state with respect to the substrate 1; anchor portions 21, 22, 23, and 24 to fix to the substrate 1; movable electrodes 41 and 42 disposed so as to protrude from the weight 4 and which function as a gate in terms of a transistor; and electrodes 51, 52, 53, and 54 for vibration use to impart vibration to the weight 4 and movable electrodes 41 and 42.

Herein, the weight 4, movable electrodes 41 and 42, and electrodes for vibration use 51 to 54 are disposed above the substrate 1 with a predetermined gap interposed therebetween, and are supported by the beams 31 to 34 and anchor portions 21 to 24. Further, the anchor portions 21 to 24 are formed on a remained sacrificial layer not illustrated in FIG. 1.

These anchor portions 21 to 24, beam portions 31 to 34, weight 4, movable electrodes 41 and 42, and electrodes for vibration use 51 to 54 are structured integrally of, for example, polycrystalline silicon and a heat resistant metal such as tungsten or the like. According to the present embodiment, polycrystalline silicon is employed as a typical material.

Meanwhile, the structural bodies which will be described hereinafter are disposed on the semiconductor substrate 1.

Source electrodes 71 and 72 as well as drain electrodes 81 and 82, which are composed of a diffusion layer formed by introducing n-type impurities into the p-type silicon substrate 1 through a method such as ion implantation or the like, are disposed at a surface of the semiconductor substrate 1 corresponding to the movable electrodes 41 and 42 to thereby make up transistors, each having an air gap with respect to the corresponding movable electrode, together with the movable electrodes 41 and 42.

Additionally, fixed electrodes for vibration use 61, 62, 63, and 64 are provided. The fixed electrodes for vibration use 61, 62, 63, and 64 impart a potential differential having a predetermined frequency in the interval between these and the electrodes for vibration use 51 to 54 formed integrally with the weight 4. When a voltage for vibration use of a certain frequency is applied between the electrodes for vibration use 51 to 54 and the fixed electrodes for vibration use 61 to 64, horizontal vibration is generated on the side of the vibration electrodes 51 to 54 which are in a movable state due to electrostatic force, and vibration in the x direction indicated in FIG. 1 is imparted to the weight 4. Furthermore, the fixed electrodes for vibration use 61 to 64 are formed of polycrystalline silicon material simultaneously with the electrodes for vibration use 51 to 54 and the like. Additionally, these fixed electrodes for vibration use 61 to 64 are fixed via anchor portions (not shown) on a LOCOS oxide film (not shown in FIG. 1) which is formed on the substrate 1.

In addition, under the microstructure except for the movable electrodes 41 and 42, an underlying electrode 9 is formed by introducing n-type impurities into the p-type silicon substrate 1 through a method such as ion implantation or the like, and the movable electrode 4 is prevented from being displaced in the substrate direction by electrostatic force and touching the substrate by causing the underlying electrode 9 to be equipotential with the weight 4.

The movable electrodes 41 and 42 are connected together with the weight 4, beams 31 to 34, and anchor portions 21 to 24 to peripheral circuit via wiring (not illustrated), and the underlying electrode 9 also is connected via wiring (not illustrated) to peripheral circuit. Furthermore, the fixed electrodes for vibration use 61 to 64 are connected via wiring (not illustrated) to peripheral circuit so as to be supplied with a voltage signal for vibration use having predetermined frequency. However, the voltage-signal phase of the voltage signal for vibration use applied to the set of 61 and 62 and the voltage signal for vibration use applied to the set of 63 and 64 is shifted by 180 degrees. Moreover, source electrodes 71 and 72 and drain electrodes 81 and 82 are connected via aluminum wirings (not illustrated) to a current-detection circuit (not illustrated) among the peripheral circuit.

Figure 2:
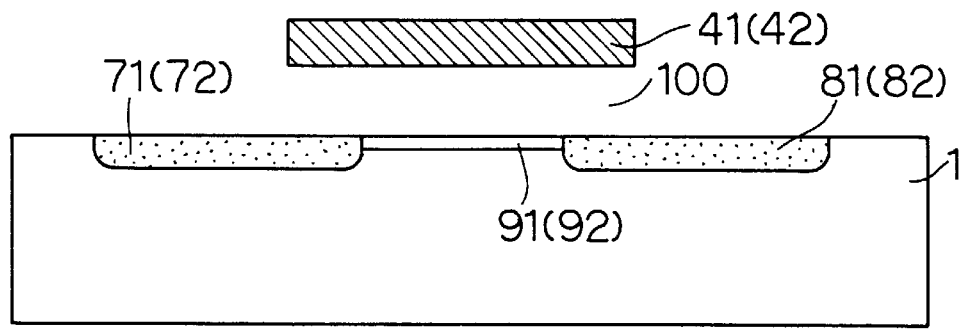
FIG. 2 is a sectional view taken along line II—II of FIG. 1.

FIG. 2 indicates a sectional structure corresponding to line II—II of FIG. 1.

The semiconductor substrate 1 is made up of p-type silicon, and the source electrode 71 and drain electrode 81 which are diffusion layers are formed by n-type impurities in a main-surface of the substrate 1; an inversion layer 91 is formed between the source electrode 71 and drain electrode 81 by a gate potential applied to the movable electrode 41.

A gap 100 is provided between the movable electrode 41 and the semiconductor substrate 1, and the movable electrode 41 becomes perpendicularly displaceable with respect to the substrate.

Figure 3:
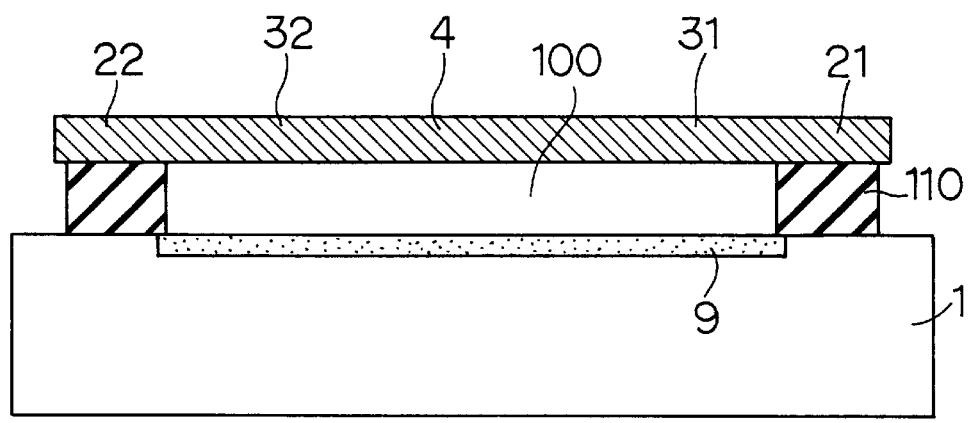
FIG. 3 is a sectional view taken along line III—III of FIG. 1.

FIG. 3 indicates a sectional structure corresponding to line III—III of FIG. 1. The weight 4 is supported via the beams 31 and 32 and anchor portions 21 and 22 at an insulation film 110 (a sacrificial film which will be described later) formed on the semiconductor substrate 1.

Distance of the gap 100 is established by the thickness of the insulation film 110, and the insulation film 110 is made up of $SiO_2$, $Si_3N_4$, or the like.

The insulation film 110 is made up of a sacrificial layer which establishes the interval between the weight 4 or the beams 31 to 34 and the semiconductor substrate 1, and is etched away except for a portion corresponding to the anchor portions 21 to 24, and the gap 100 is formed across the entire microstructure region. At the time of this etching, etchant is used whereby the polycrystalline silicon substrate 1 which is the material making up the weight 4, beams 31 to 34, and anchor portions 21 to 24 is not etched, but only the insulation film 110 which is the sacrificial layer is etched.

Additionally, the underlying electrode 9 composed of an n-type impurity diffusion layer is formed on the main surface of the semiconductor substrate 1.

Figure 4:
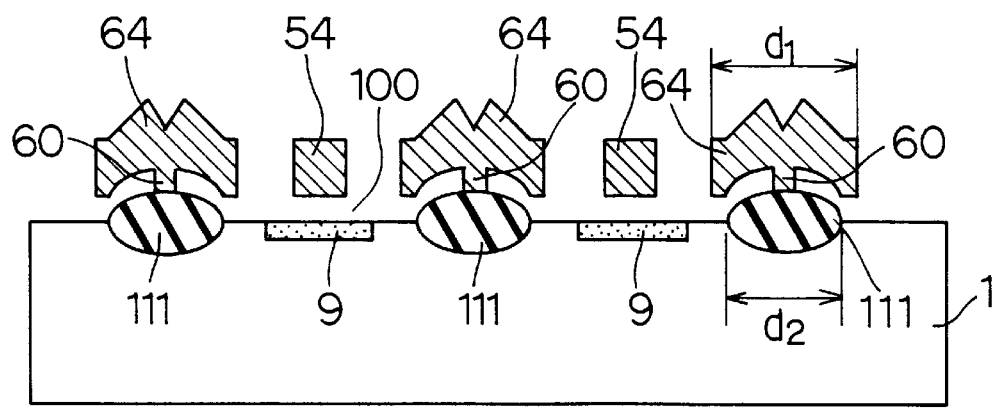
FIG. 4 is a sectional view taken along line IV—IV of FIG. 1.

FIG. 4 indicates a sectional structure corresponding to line IV—IV of FIG. 1.

A LOCOS oxide film 111 is formed on the semiconductor substrate 1, and the fixed electrodes for vibration use 64 are disposed on the LOCOS oxide film 111 at a portion thereof as an anchor 60.

The electrodes for vibration use 54 exits respectively at central positions between the fixed electrodes for vibration use 64 which resemble the teeth of a comb, and a gap 100 is interposed in the interval with the surface of the substrate 1.

The underlying electrode 9 is formed on the substrate to oppose the electrodes for vibration use 54, and is caused to be equipotential with the electrodes for vibration use 54 so that attraction force due to electrostatic force is not generated between the electrodes for vibration use 54 and the substrate 1.

When the voltage signal for vibration use is applied to the fixed electrodes for vibration use 64, electrostatic force is produced at the electrodes for vibration use 54, but because a voltage signal for vibration use the phase of which is shifted 180 degrees is applied to the fixed electrode for vibration use 61 with respect to the electrode for vibration use 51 protruding from the weight 4 on the opposite side, displacement of the weight 4 occurs in the horizontal direction of the substrate.

Additionally, as is indicated by d1 and d2 in FIG. 4, width d1 of the fixed electrode for vibration use is established to be larger than width d2 of the LOCOS oxide film 111. In a case where d1 is smaller than d2, the gap between the substrate surface and the portion of the fixed electrode for vibration use 64 which opposes the electrode for vibration use 54 becomes larger by an amount corresponding to the thickness of the LOCOS oxide film 111, height thereof differs from the electrode for vibration use 54, the magnitude of electrostatic force is changed from the design, and a problem occurs in which sensitivity and the like of the sensor change. On the other hand, when d1 is larger than d2, the portion of the fixed electrode for vibration use 64 which opposes the electrode for vibration use 54 is separated from the substrate by a distance defined by the thickness of the sacrificial layer (not illustrated). That is to say, the portion of the fixed electrode for vibration use 64 which opposes the electrode for vibration use 54 can be disposed at the same height as the electrode for vibration use 54. A difference between d1 and d2 of 10 μm or less is preferred. This is because, when the protrusion of the fixed electrode from the LOCOS oxide film 111 is large, the fixed electrode for vibration use is pulled toward the substrate and displaced by electrostatic force generated in the interval with the substrate 1. Reducing the difference between d1 and d2 is effective in reducing this displacement.

To describe operation of a yaw-rate sensor structured in this way, when voltage is applied between the movable electrodes 41 and 42 and the semiconductor substrate 1, inversion layers 91 and 92 are respectively formed between the source electrodes 71 and 72 and the drain electrodes 81 and 82, and currents flow therethrough.

Additionally, when voltage for vibration use of a certain frequency is applied between the fixed electrodes for vibration use 61 to 64 and the electrodes for vibration use 51 to 54 with phase shifted by 180 degrees at the fixed electrode for vibration use 61, 62 and 63, 64, the weight 4 is caused to be vibrated in a direction horizontal with the substrate 1 (i.e., the x direction in FIG. 1).

Because Coriolis force generated by yaw rate is proportionate to the speed of this vibration, it is preferred that a frequency with a resonance point where amplitude of frequency becomes larger be selected in order to obtain a large vibration speed.

When yaw rate ω having an axis which is horizontal with respect to the semiconductor substrate and perpendicular to the vibration direction x is generated with respect to the weight 4 which is excited and vibrated in this way, Coriolis force which is proportional to the vibration speed and vibrating-body mass is generated, and the weight 4 is displaced perpendicularly with respect to the substrate. Because of this, the movable electrodes 41 and 42 are also displaced, and the gap 100 indicated in FIG. 2 changes. That is to say, electric field intensity applied to the inversion layer 91 (92) changes and carrier concentration of the inversion layer 91 (92) changes due to the movable electrode 41 (42) which functions as a gate being displaced with respect to the substrate 1, and the amount of current between the source electrode 71 (72) and the drain electrode 81 (82) changes. It becomes possible to detect yaw rate by this current change.

Here, in a case where Coriolis force acting upon the vibrating-body due to yaw rate is detected with high sensitivity, it is effective to increase vibration speed. For this reason, it is necessary to enlarge the amplitude of the vibrating-body which is vibrating at the resonant frequency.

To enlarge the amplitude of the vibrating-body which is vibrating at the resonant frequency, it is sufficient to increase the voltage applied to the fixed electrode for vibration use. According to the present embodiment, the fixed electrode for vibration use is disposed on a LOCOS oxide film having a large dielectric breakdown voltage as shown in FIG. 4, and so a large voltage can be applied to the fixed electrode for vibration use, and a high-sensitivity yaw-rate sensor having a weight 4 with a large amplitude can be structured.

A method of fabrication according to the present embodiment will be described hereinafter with reference to a sectional view taken along line IV—IV of FIG. 1 as representative.

Figure 5A:
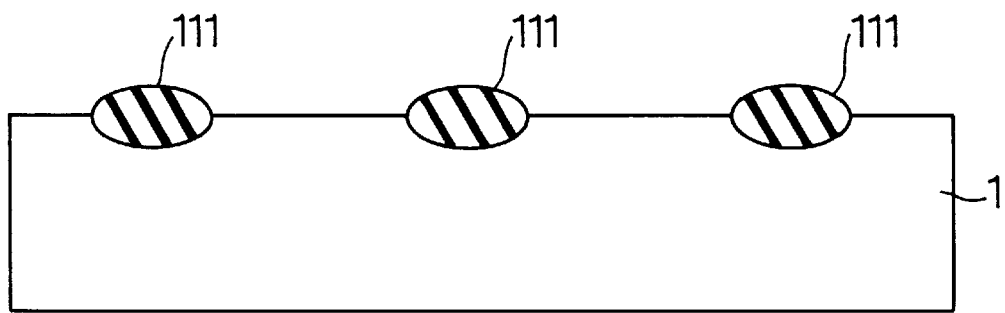
FIGS. 5A to 5E are sectional views indicating fabrication steps of the first embodiment.

As shown in FIG. 5A, a LOCOS oxide film 111 having a thickness of 50 nm or more or which is thicker than an ordinary transistor gate oxide film is formed as an insulation film on a semiconductor substrate 1.

Figure 5B:
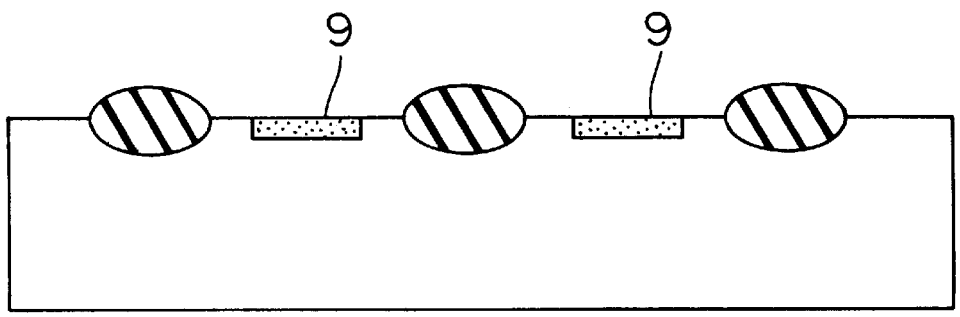

Next, as shown in FIG. 5B, impurities are introduced into a surface of the semiconductor substrate by ion implantation, and a diffusion region 9 which becomes an underlying electrode is formed. Source electrode 71 and 72 and drain electrode 81 and 82 are also formed simultaneously at this time.

Figure 5C:
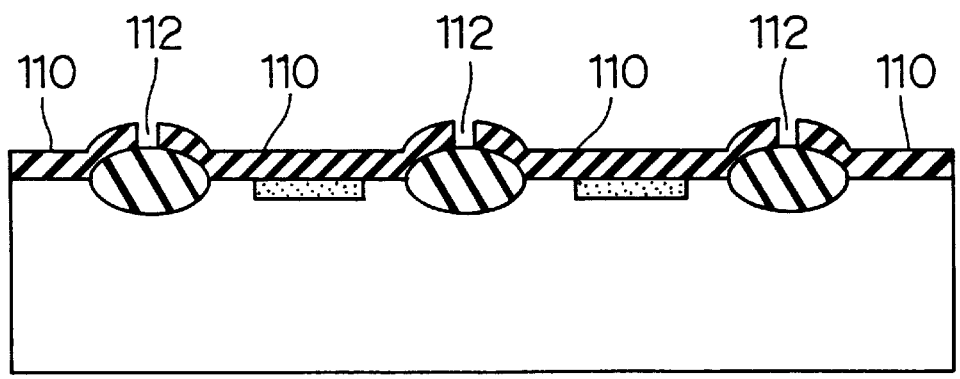

Thereafter, as shown in FIG. 5C, a sacrificial layer 110 is formed on the substrate 1, an etching step is executed, and open portions 112 which become anchor portions of fixed electrodes for vibration use 64 are disposed on the LOCOS oxide film 111.

Figure 5D:
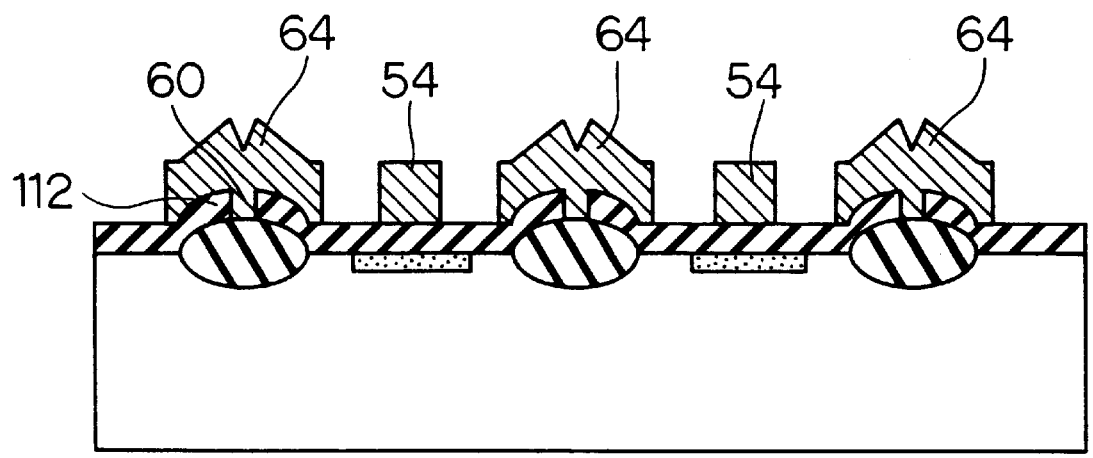

Next, as shown in FIG. 5D, a polycrystalline silicon film is deposited and patterned to form electrodes for vibration use 54 and fixed electrodes for vibration use 64. Anchor portions 21 to 24, beams 31 to 34, a weight 4, and movable electrodes 41 and 42 are also formed simultaneously at this time. Additionally, other electrodes for vibration use 51 to 53 and fixed electrodes for vibration use 61 to 63 are also formed simultaneously. Anchor portions 60 of the fixed electrodes for vibration use are formed in the open portions 112.

Figure 5E:
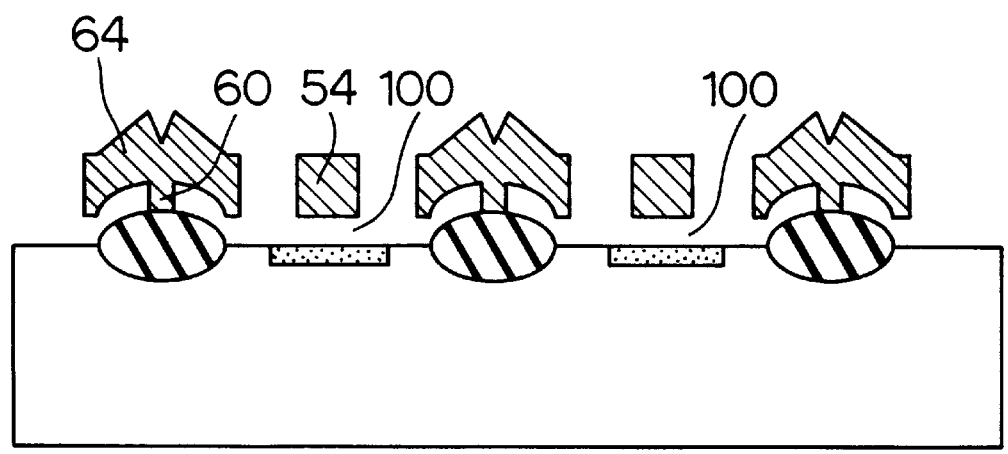

Next, as shown in FIG. 5E, sacrificial-layer etching is performed, and gaps 100 are formed and the electrodes for vibration use 54 are placed in a movable state. The sacrificial layer 110 below the beams 31 to 34, weight 4, and movable electrodes 41 and 42 is also simultaneously etched at this time, and vibration in the horizontal direction of the substrate due to excitation as well as displacement perpendicularly by Coriolis force due to yaw rate become possible, and functioning as a sensor to detect yaw rate with a transistor becomes possible.

In a case where an oxide film is employed as the sacrificial layer 110 in the present fabrication step, it is preferred that a nitride film be formed on the LOCOS oxide film 111 priorly to sacrificial layer 110 formation. The LOCOS oxide film 111 can be protected from the etchant by this nitride film at the time of etching of the sacrificial layer which is an oxide film.

In a yaw-rate sensor according to the present embodiment, the number of comb teeth of the respective fixed electrodes for vibration use was three, and the number of comb teeth of the respective electrodes for vibration use was two, but a greater or less number is also acceptable.

Additionally, the opposing surfaces of the fixed electrodes for vibration use and the electrodes for vibration use were caused to be the same height, but there is no need for the height to be necessarily the same. Employment of a p-type semiconductor as the substrate was described, but this can also be made up of an n-type semiconductor, and so the diffusion electrode in this case is made up of a p-type.

Figure 6:
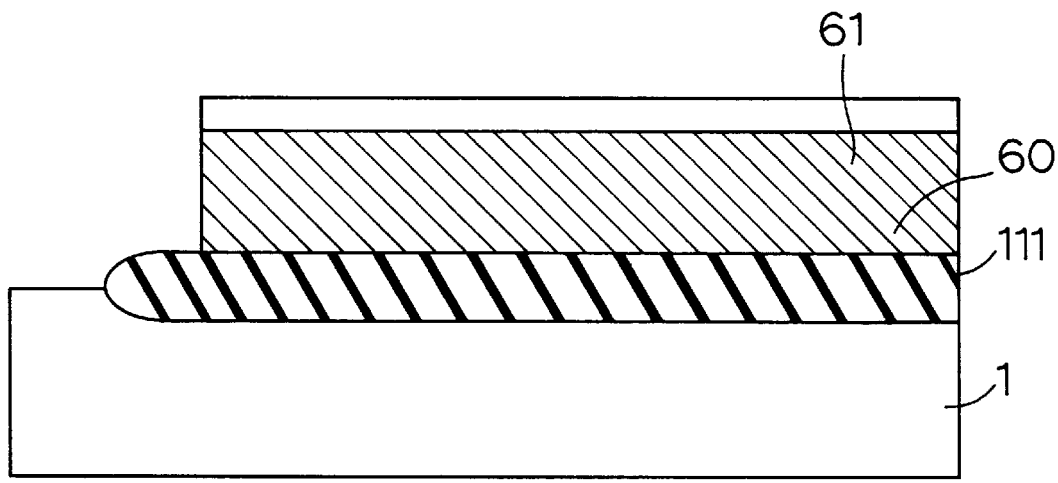
FIG. 6 is a sectional view taken along line VI—VI of FIG. 1.

A sectional view taken along line VI—VI in FIG. 1 is indicated in FIG. 6.

A LOCOS oxide film 111 is formed on a semiconductor substrate 1, and a fixed electrode for vibration use 61 a portion of which serves an anchor 60 is formed on the LOCOS oxide film 111. When structure is such as this, there is resistance to dielectric breakdown even if high voltage is applied to the fixed electrode for vibration use 61, and the fixed electrode for vibration use 61 is not displaced even if electrostatic force is generated in the interval with the substrate.

Figure 7:
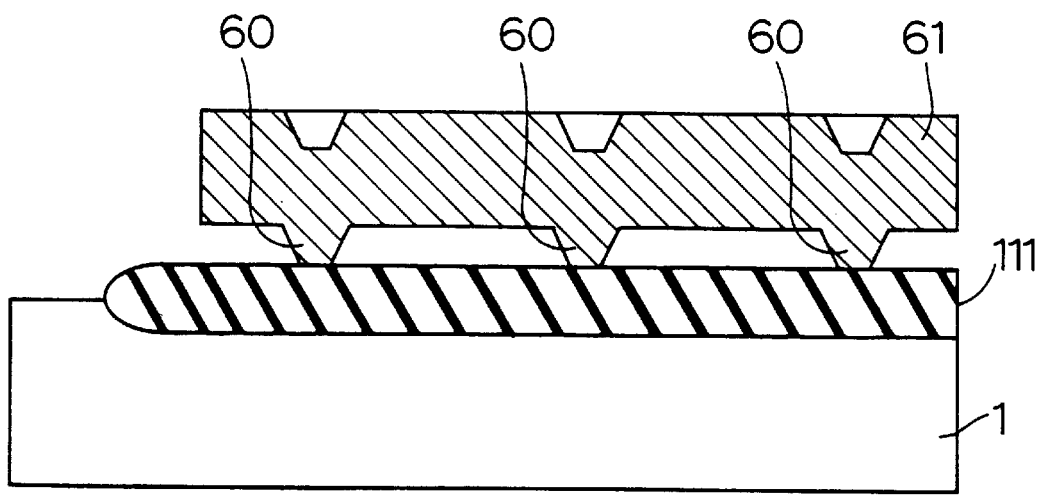
FIG. 7 is a sectional view indicating an example of a structure where a plurality of anchor portions have been provided.

Furthermore, as shown in FIG. 7, a structure in which a plurality of anchor portions 60 are provided is also acceptable.

Figure 8:
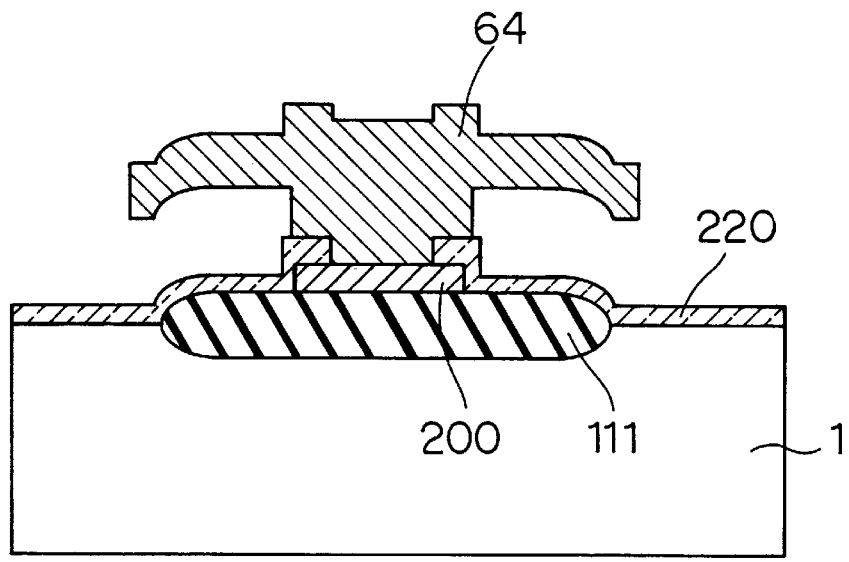
FIG. 8 is a sectional view indicating another example of an anchor structure of a fixed electrode for vibration use.

Next, FIG. 8 indicates another example of an anchor structure which can apply a voltage for vibration use of higher voltage, with a portion of a fixed electrode for vibration use corresponding to a portion of a sectional view taken along line IV—IV in FIG. 1 as representative.

In the present example, differences with the sectional view indicated in FIG. 4 will primarily be described.

A fixed electrode for vibration use 64 is formed on a LOCOS oxide film 111 via a heat resistant conductive material 200. Moreover, a nitride film 220 is provided to protect the LOCOS oxide film 111 during sacrificial-layer etching.

Figure 9:
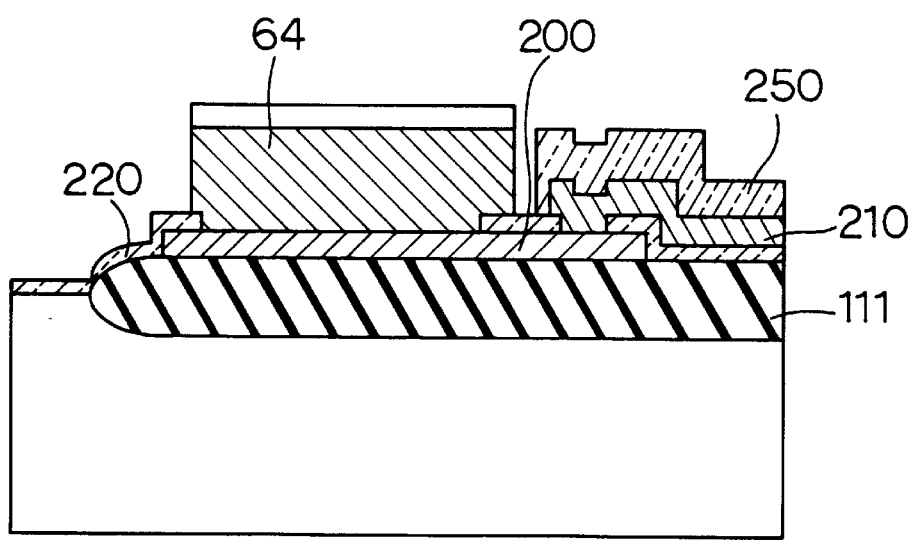
FIG. 9 is a sectional view corresponding to a section of FIG. 8 taken along line VI—VI of FIG. 1.

A sectional view in the structure in FIG. 8 corresponding to the sectional view taken along line VI—VI in FIG. 1 is indicated in FIG. 9.

The heat resistant conductive material 200 is formed on the LOCOS oxide film 111, the heat resistant conductive material 200 is formed to be longer than the fixed electrode for vibration use 64, and aluminum wiring 210 is connected at an end thereof. A nitride film 250 is formed on the aluminum wiring with an object of protecting the aluminum wiring during sacrificial-layer etching.

The aluminum wiring 210 is connected to peripheral circuit. Consequently, the fixed electrode for vibration use 64 is connected to peripheral circuit via the heat resistant conductive material 200 and aluminum wiring 210.

When structure is such as this, a step occurring in wiring is smaller when wiring is drawn from the fixed electrode for vibration use 64 compared with when wiring is extracted from an upper portion of the fixed electrode for vibration use 64, and a problem with a disconnection in wiring can be avoided.

Steps of fabrication of the structure indicated in FIGS. 8 and 9 will be described hereinafter. FIGS. 10A to 17A indicate sectional views in fabrication-step sequence in a sectional view corresponding to FIG. 8, and FIGS. 10B to 17B indicate sectional views in fabrication-step sequence in a sectional view corresponding to FIG. 9.

As shown in FIGS. 10A and 10B, a LOCOS oxide film 111 is formed on a semiconductor substrate 1.

Next, as shown in FIGS. 11A and 11B, a heat resistant conductive material 200 such as for example polycrystalline silicon is formed on the LOCOS oxide film 111.

In FIGS. 12A and 12B, a nitride film 220 is formed on a main surface of the substrate 1, and an open portion 230 for fixed-electrode anchor use is formed on the nitride film 220 to expose an upper portion of the heat resistant conductive material 200.

Next, as shown in FIGS. 13A and 13B, a sacrificial layer 110 is formed on the nitride film 220, an etching step is executed, and open portions 240 and 241 are formed at anchor-portion and wiring-formation positions of the sacrificial layer 110 on the LOCOS oxide film 111.

Figure 14A:
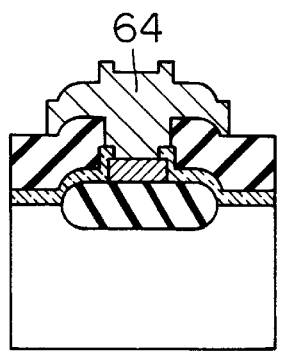
Figure 14B:
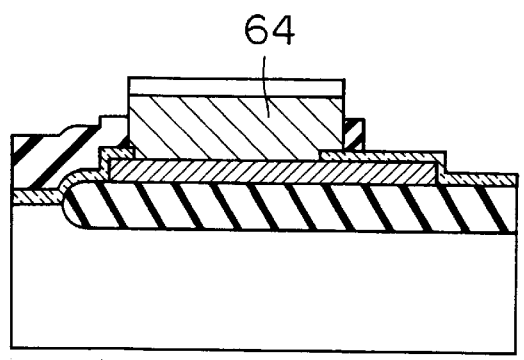

Next, in FIGS. 14A and 14B, film-formation of a heat resistant metallic layer such as polycrystalline silicon or tungsten is performed, and a fixed electrode for vibration use 64 is formed. Microstructure anchor portions 21 to 24, beams 31 to 34, a weight 4, and movable electrodes 41 and 42 are also formed simultaneously at this time.

Figure 15A:
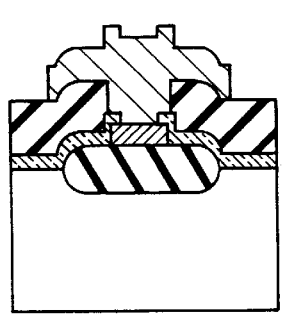
Figure 15B:
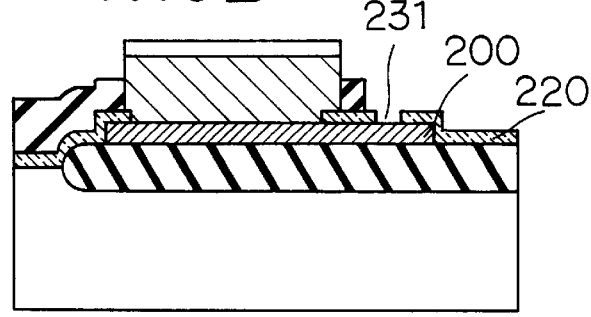

Next, as shown in FIGS. 15A and 15B, a contact hole 231 for wiring use is formed in the nitride film 220 so as to expose a portion of the heat resistant conductive material 200.

Figure 16A:
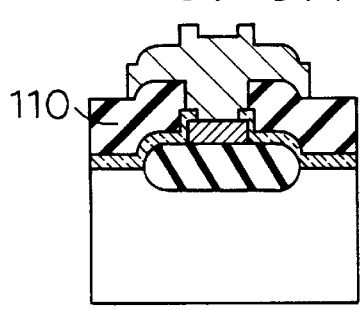
Figure 16B:
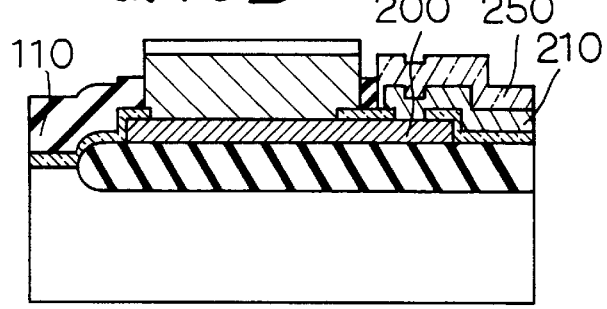

Next, as shown in FIGS. 16A and 16B, aluminum wiring 210 connected via the contact hole 231 to the heat resistant conductive material 200 is formed, and a nitride film 250 is formed on the aluminum wiring 210. It is preferred that a plasma nitride film for passivation use be employed for the nitride film 250.

Figure 17A:
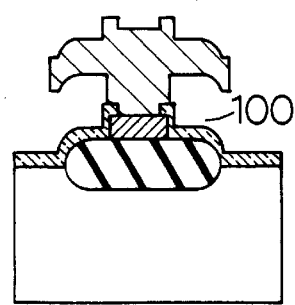
Figure 17B:
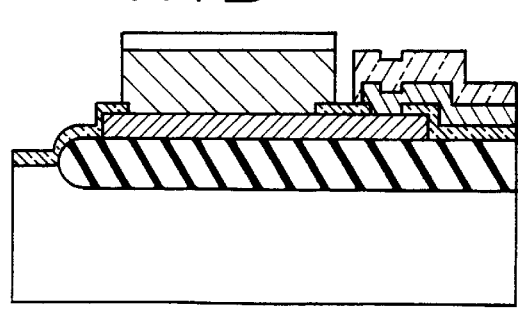

Next, as shown in FIGS. 17A and 17B, the sacrificial layer 110 is etched away, and a gap 100 is formed. In a case where the sacrificial layer 100 is an oxide film or the like, HF or the like is used as etchant, and the aluminum wiring 210 is protected by the nitride film 250 and is not etched.

Additionally, the sacrificial layer 110 which is a lower portion of the beams 31 to 34, weight 4, and movable electrodes 41 and 42 is also simultaneously etched at this time, and vibration in the horizontal direction of the substrate due to excitation as well as displacement perpendicularly by Coriolis force due to yaw rate become possible, and yaw-rate detection becomes possible.

A structure of an anchor portion of a fixed electrode for vibration use was described according to the present embodiment, but it is also acceptable for this to be employed in for example the anchor portions 21, 22, 23, and 24 indicated in FIG. 1 on the movable microstructure side.

Figure 18:
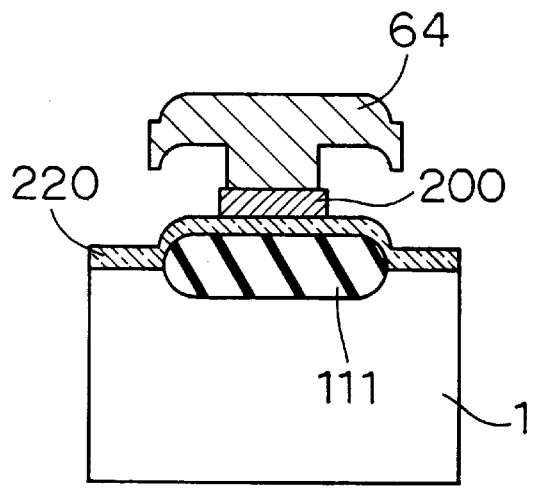
FIG. 18 is a sectional view indicating another example of an anchor structure of a fixed electrode for vibration use.
Figure 19:
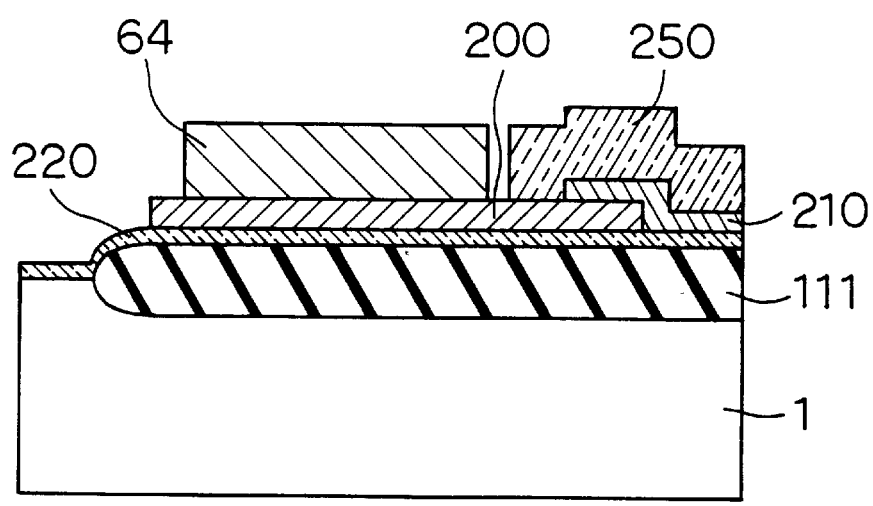
FIG. 19 is a sectional view corresponding to a section of FIG. 18 taken along line VI—VI of FIG. 1.

Another example of an anchor structure of the fixed electrode for vibration use shown in FIGS. 8 and 9 is indicated respectively in FIGS. 18 and 19. A difference between the example in these FIGS. 18 and 19 and the anchor structure indicated in FIGS. 8 and 9 is that a heat resistant conductive material 200 is formed on a nitride film 220 according to the present embodiment, and a method of fabrication thereof will be described hereinafter. FIGS. 20A to 26A indicate sectional views in fabrication-step sequence in a sectional view corresponding to FIG. 18, and FIGS. 20B to 26B indicate sectional views in fabrication-step sequence in a sectional view corresponding to FIG. 19.

Figure 20A:
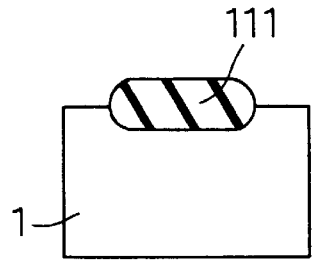
Figure 20B:
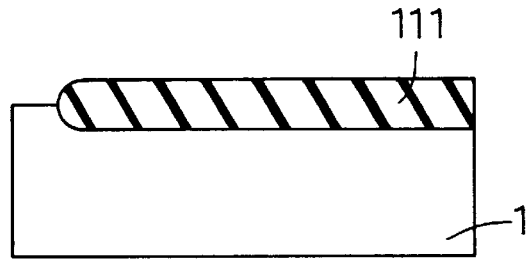

Firstly, as shown in FIGS. 20A and 20B, a LOCOS oxide film 111 is formed on a semiconductor substrate 1.

Figure 21A:
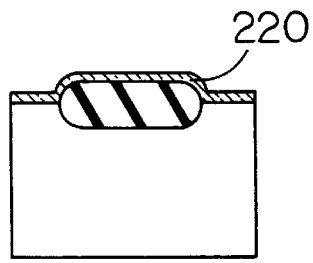
Figure 21B:
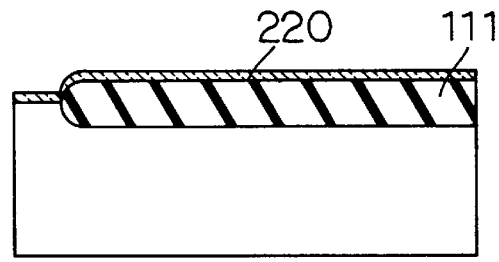

Next, as shown in FIGS. 21A and 21B, a nitride film 220 is formed on a main surface of the semiconductor substrate 1.

Figure 22A:
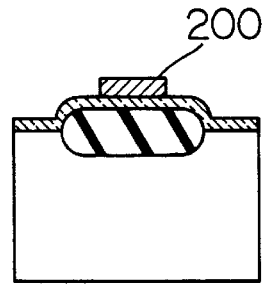
Figure 22B:
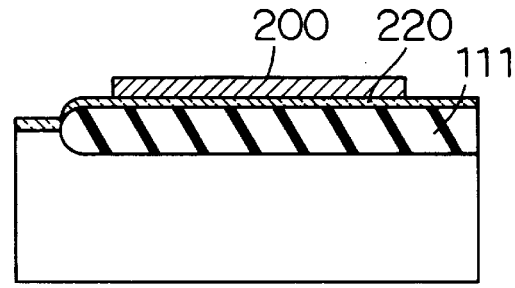
Figure 23A:
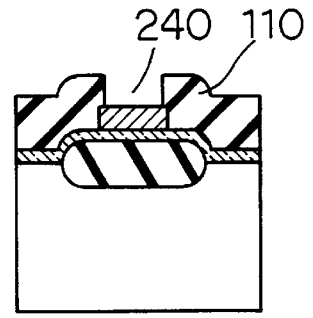
Figure 23B:
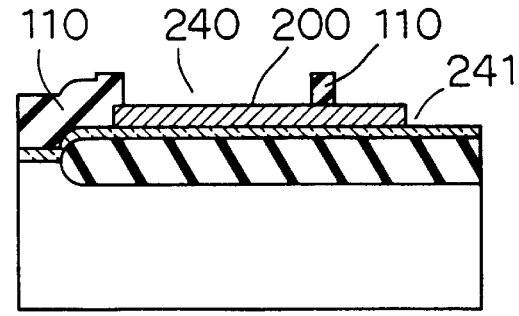
Figure 27A:
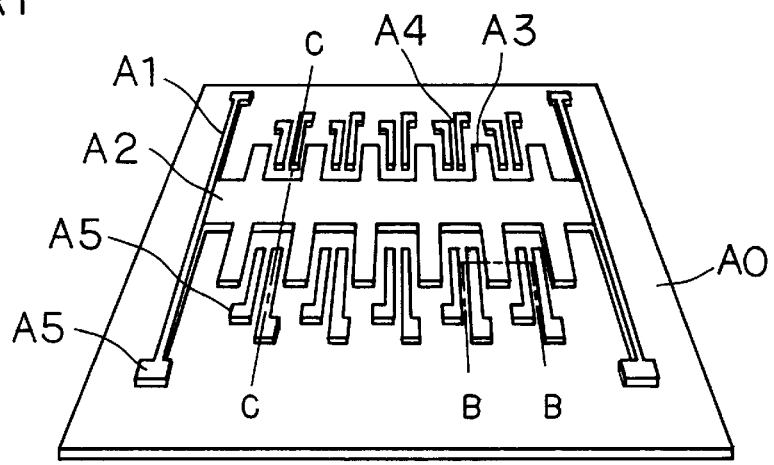
FIG. 27A is a perspective view indicating an entirety of a conventional acceleration sensor.
Figure 27B:
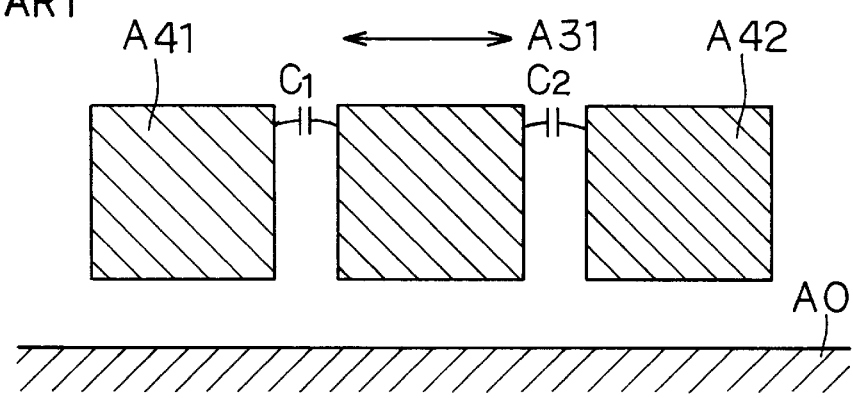
FIG. 27B is a sectional view taken along line B—B of FIG. 27A.
Figure 27C:
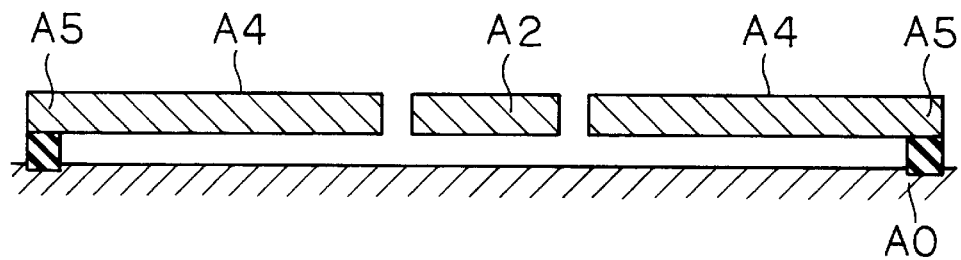
FIG. 27C is a sectional view taken along line C—C of FIG. 27A.

Next, as shown in FIGS. 22A and 22B, a heat resistant conductive material 200 such as for example polycrystalline silicon is formed on the LOCOS oxide film 111 and nitride film 220. Next, as shown in FIGS. 23A and 23B, a sacrificial layer 110 is formed on the main surface of the semiconductor substrate 1, an etching step is executed, and thereby an open portion 240 for an anchor portion and an open portion 241 for wiring, each of which exposes an upper portion of the heat resistant conductive material 200, are formed in the sacrificial layer 110 on the LOCOS oxide film 111.

Next, as shown in FIGS. 24A and 24B, film-formation of a heat resistant metallic layer such as polycrystalline silicon or tungsten is performed, and a fixed electrode for vibration use 64 is formed. Microstructure anchor portions 21 to 24, beams 31 to 34, a weight 4, and movable electrodes 41 and 42 are also formed simultaneously at this time.

Next, as shown in FIGS. 25A and 25B, aluminum wiring 210 connected to the heat resistant conductive material 200 is formed, and a nitride film 250 is formed on the aluminum wiring 210.

Next, as shown in FIGS. 26A and 26B, the sacrificial layer 110 is etched away, and a gap 100 is formed.

According to the structure indicated in FIGS. 8 and 9, the nitride film 220 constantly protects the heat resistant conductive material 200 and plays a role in passivation, and the heat resistant conductive material 200 assumes a structure whereby physical changes over time due to the environment do not easily occur.

In contrast to this, the structure indicated in FIGS. 18 and 19 is characterized in that the heat resistant conductive material 200 exists on the nitride film 220, a step to form an open portion for an anchor for use by the fixed electrode for vibration use and a contact hole can be omitted, and the process can be shortened.

A yaw-rate sensor has been described with reference to the foregoing embodiments, but the present invention can also be utilized in an acceleration sensor which performs servo detection, or in an actuator which utilizes electrostatic force.

Consequently, as has been described in detail above, according to the present invention, by causing an anchor portion of a fixed electrode for electrostatic force use, i.e., fixed electrode for vibration use, to exist on a thick insulation film which is a LOCOS oxide film, measurement of high accuracy can be performed without occurrence of deformation or displacement of the fixed electrode for electrostatic force use even if voltage applied to the fixed electrode for electrostatic force use is caused to be changed, and it becomes possible to provide a semiconductor physical-quantity sensor which can increase a dielectric breakdown voltage between the fixed electrode for electrostatic force use and a substrate without varying a thickness of a sacrificial layer of an insulator or causing sacrificial-layer etching time to be affected, as well as a method for fabricating same.

In specific terms, effects are as will be described hereinafter.

Dielectric breakdown voltage can be caused to increase in comparison with a case where an anchor portion of a fixed electrode for electrostatic force use is provided on an ordinary pn-junction portion, natural oxidation film, or a gate oxide film, voltage applied to the fixed electrode for electrostatic force use can be enlarged, and along with this, a sufficiently thick insulation film can be obtained by utilizing a LOCOS oxide film without causing processes to be increased.

Additionally, when the LOCOS oxide film is placed in a state whereby it is covered by a nitride film, the LOCOS oxide film can be protected from an etching step, for example sacrificial-layer etching, in the fabrication process.

Additionally, when made such that the fixed electrode for electrostatic force use is supported at a plurality of positions, a spring coefficient thereof can be made considerably larger in comparison with a case where a fixed electrode is supported at one end thereof by an anchor portion, and deformation and displacement of the fixed electrode for electrostatic force use due to electrostatic force with the substrate can be reduced.

In particular, when a plurality of anchor portions are disposed along a lengthwise direction of the fixed electrode for electrostatic force use, deformation of the fixed electrode can be reduced to a negligible extent in comparison with a case where a fixed electrode is supported at one end thereof by an anchor portion.

Furthermore, by forming conductive material on a LOCOS oxide film and forming an anchor portion of a fixed electrode for electrostatic force use and the like on the conductive material, wiring of a movable electrode and/or fixed electrode via anchor portion thereof can be formed without leading to a breakage in wiring.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor physical-quantity sensor, comprising:
 a semiconductor substrate;
 a movable member having an anchor portion which anchors said movable member to said semiconductor substrate, wherein said movable member is displaced by and detects a physical quantity acting from both a direction parallel to said semiconductor substrate and a direction non-parallel on relative to said semiconductor substrate on said movable member;
 an oxide film formed on said semiconductor substrate; and
 a fixed member including an anchor portion which anchors said fixed member to said semiconductor substrate by said oxide film, said fixed member extending above said semiconductor substrate and said oxide film to a height above a height of said movable member, and including a communication portion that extends outwardly at a height corresponding to a height of said movable member to facilitate communication between said movable member and said fixed member, said communication portion defining a gap across which an electrostatic force is generated by a voltage applied therebetween.

2. A semiconductor physical-quantity sensor, comprising:
 a semiconductor substrate;
 a movable member having an anchor portion which anchors said movable member to said semiconductor substrate, said movable member being displaced by and detecting a physical quantity acting from both a direction parallel to said semiconductor substrate and a direction non-parallel to said semiconductor substrate;
 an oxide film formed on said semiconductor substrate; and
 a fixed member including an anchor portion by which said fixed member is fixed to said semiconductor substrate by said oxide film said oxide film having a center thickness in proximity to said anchor portion that tapers to a peripheral thickness less than the center thickness to thereby inhibit breakdown of said oxide film when a voltage is applied between said movable member and said fixed member.

3. The sensor of claim 1, wherein said fixed member defines an air gap between said fixed member and said oxide film.

4. The sensor of claim 2, wherein said fixed member defines an air gap between said fixed member and said oxide film.

5. The sensor of claim 3, wherein said fixed member is a fixed electrode.

6. The sensor of claim 4, wherein said fixed member is a fixed electrode.

7. The semiconductor physical-quantity sensor of claim 1, wherein the movable member further detects a yaw rate.

8. The semiconductor physical-quantity sensor of claim 2, wherein the movable member further detects a yaw rate.

9. A semiconductor physical-quantity sensor, comprising:
 a semiconductor substrate;
 a movable member having an anchor portion which anchors said movable member to said semiconductor substrate;
 an oxide film formed on said semiconductor substrate; and
 a fixed member including an anchor portion which anchors said fixed member to said semiconductor substrate by said oxide film, said fixed member extending above said semiconductor substrate and said oxide film to a height above a height of said movable member, and including a communication portion that extends outwardly at a height corresponding to a height of said movable member to facilitate communication between said movable member and said fixed member, said communication portion defining a gap across which an electrostatic force is generated by a voltage applied therebetween.

10. The sensor of claim 9, wherein said fixed member defines an air gap between said fixed member and said oxide film.

11. The sensor of claim 9, wherein said fixed member is a fixed electrode.

12. The semiconductor physical-quantity sensor of claim 9, wherein the movable member further detects a yaw rate.

13. A semiconductor physical-quantity sensor, comprising:

a semiconductor substrate;

a movable member having an anchor portion which anchors said movable member to said semiconductor substrate;

an oxide film formed on said semiconductor substrate; and a fixed member including an anchor portion by which said fixed member is fixed to said semiconductor substrate by said oxide film, said oxide film having a center thickness in proximity to said anchor portion that tapers to a peripheral thickness less than the center thickness to thereby inhibit breakdown of oxide film when a voltage is applied between said movable member and said fixed member.

14. The sensor of claim 13, wherein said fixed member defines an air gap between said fixed member and said oxide film.

15. The sensor of claim 13, wherein said fixed member is a fixed electrode.

16. The semiconductor physical-quantity sensor of claim 13, wherein the movable member further detects a yaw rate.

* * * * *